United States Patent
Bonner et al.

(10) Patent No.: US 7,363,879 B2
(45) Date of Patent: Apr. 29, 2008

(54) ANIMAL DISPLAY AND HABITAT ASSEMBLY

(75) Inventors: Ronald K. Bonner, Villa Park, CA (US); Eric R. Knudsen, Riverside, CA (US)

(73) Assignee: North American Pet Products, Corona, CA (US)

( * ) Notice: Subject to any disclaimer, the term of this patent is extended or adjusted under 35 U.S.C. 154(b) by 207 days.

(21) Appl. No.: 11/083,711

(22) Filed: Mar. 18, 2005

(65) Prior Publication Data

US 2006/0032455 A1 Feb. 16, 2006

Related U.S. Application Data

(63) Continuation-in-part of application No. 10/915,526, filed on Aug. 10, 2004, now Pat. No. 7,174,851.

(51) Int. Cl.
*A01K 1/03* (2006.01)

(52) U.S. Cl. .......................... 119/417; 119/452; 119/455

(58) Field of Classification Search ................ 119/417, 119/418, 419, 420, 452, 455, 448, 493
See application file for complete search history.

(56) References Cited

U.S. PATENT DOCUMENTS

| | | | | |
|---|---|---|---|---|
| 3,924,571 A * | 12/1975 | Holman | ...................... | 119/419 |
| 4,249,482 A * | 2/1981 | Harr | ........................... | 119/419 |
| 4,448,150 A * | 5/1984 | Catsimpoolas | ............... | 119/455 |
| 4,528,941 A * | 7/1985 | Spengler | ...................... | 119/418 |
| 4,989,545 A * | 2/1991 | Sheaffer et al. | ............. | 119/419 |
| 5,213,059 A * | 5/1993 | Krantz | ........................ | 119/419 |
| 5,307,757 A * | 5/1994 | Coiro et al. | ................. | 119/418 |
| 5,349,923 A * | 9/1994 | Sheaffer et al. | ............. | 119/418 |
| 5,865,144 A * | 2/1999 | Semenuk | ..................... | 119/456 |
| 5,996,535 A * | 12/1999 | Semenuk et al. | ........... | 119/456 |
| 6,158,387 A * | 12/2000 | Gabriel et al. | .............. | 119/419 |
| 6,308,660 B1 * | 10/2001 | Coiro et al. | ................. | 119/419 |
| 6,357,393 B1 * | 3/2002 | Coiro et al. | ................. | 119/419 |
| 6,408,794 B1 * | 6/2002 | Coiro et al. | ................. | 119/418 |
| 6,729,266 B1 | 5/2004 | Gabriel et al. | | |
| 7,131,398 B2 * | 11/2006 | Cohen et al. | ................ | 119/455 |

* cited by examiner

*Primary Examiner*—Yvonne R. Abbott
(74) *Attorney, Agent, or Firm*—Advantage IP Law Firm

(57) ABSTRACT

A ventilated animal habitat in the form of a frame having at least one shelf supporting an animal enclosure with a ventilation control region including an ambient air inlet and exhaust air outlet and a ducting system also supported by the frame with an exhaust air collection chamber having a mouth abutting the enclosure around the exhaust air outlet to capture exiting habitat air drawn under negative pressure by a remote vacuum source and direct the captured air through a carry way duct while fresh ambient air is introduced into the enclosure.

20 Claims, 8 Drawing Sheets

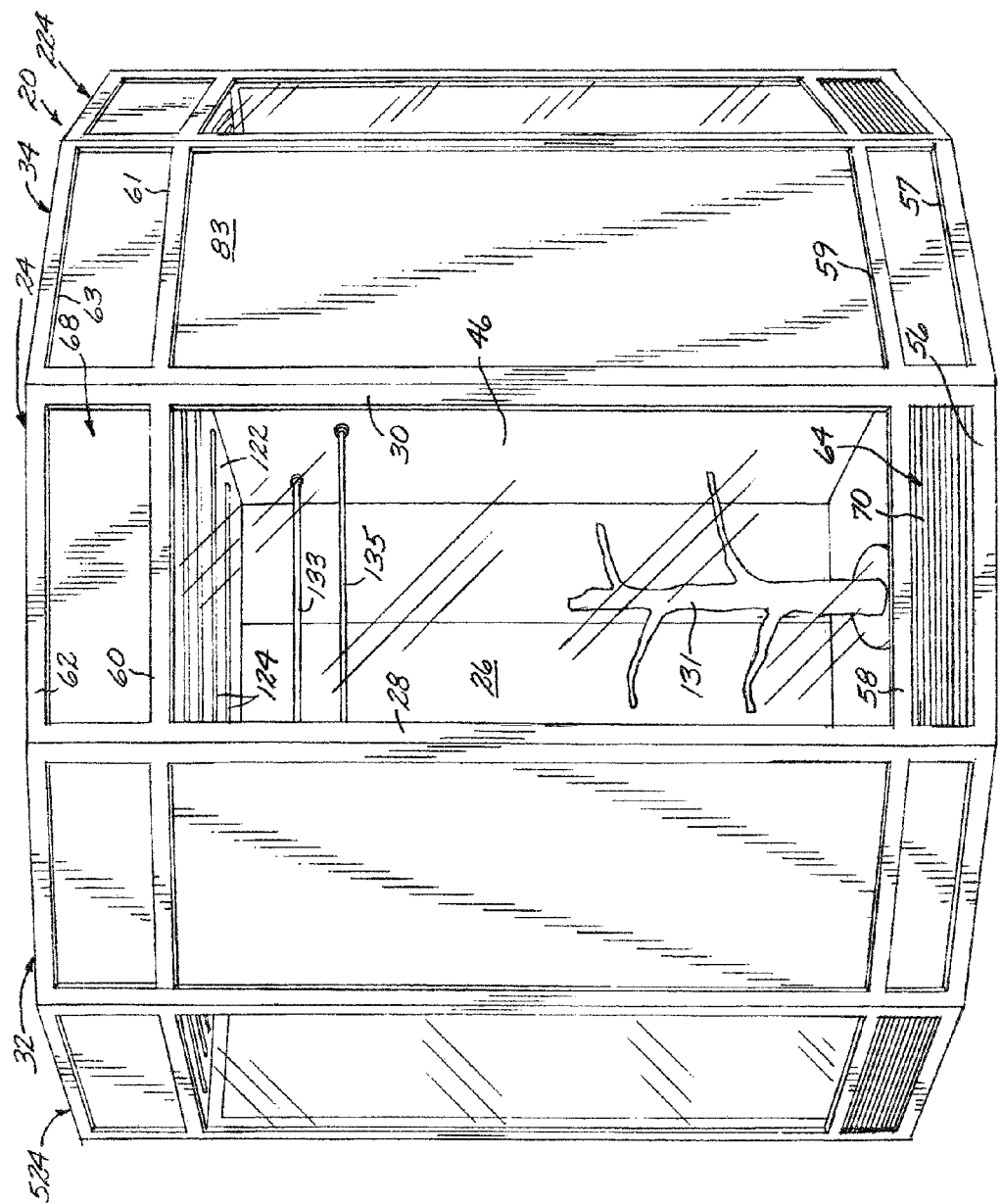

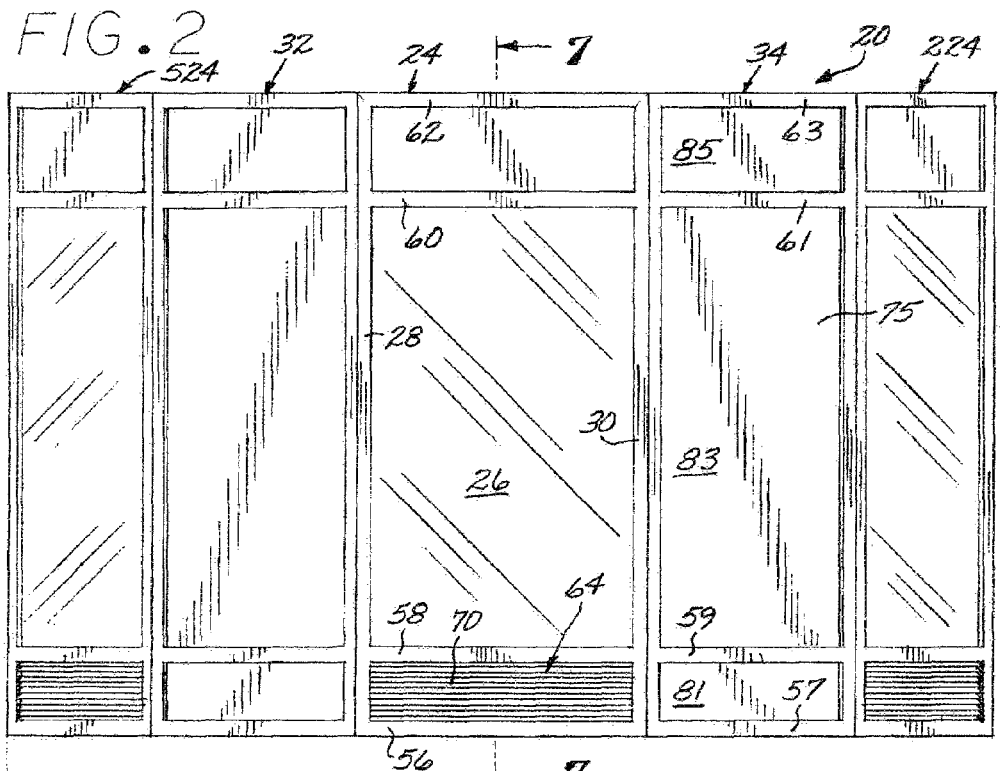
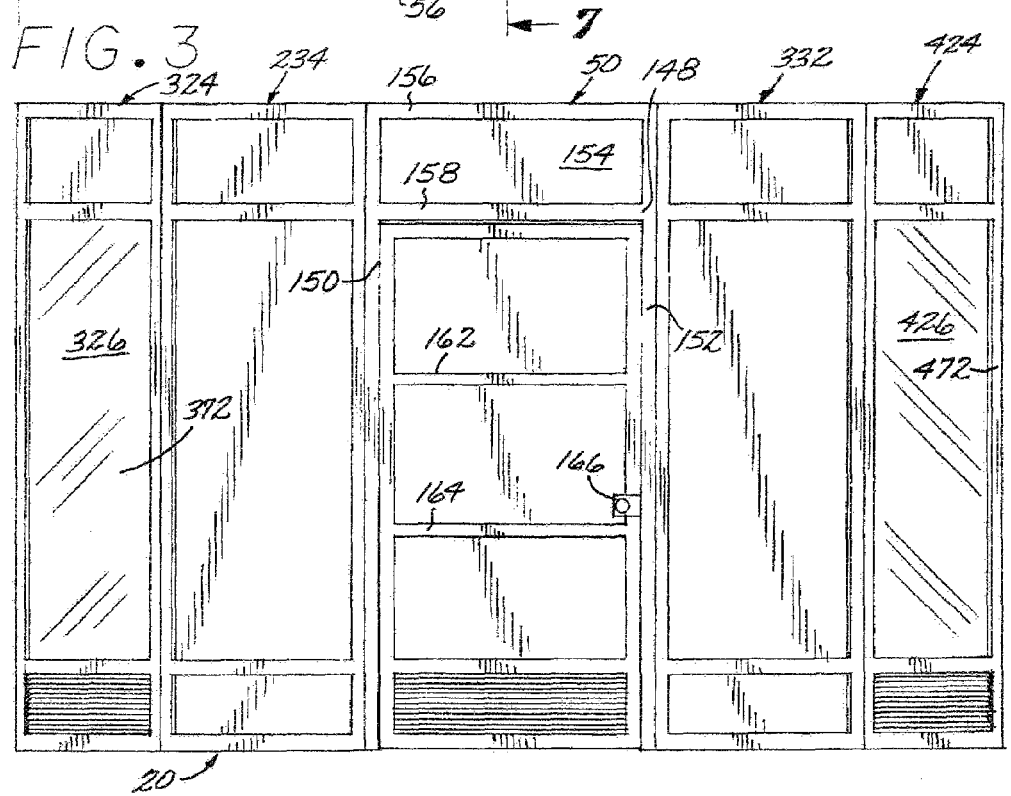

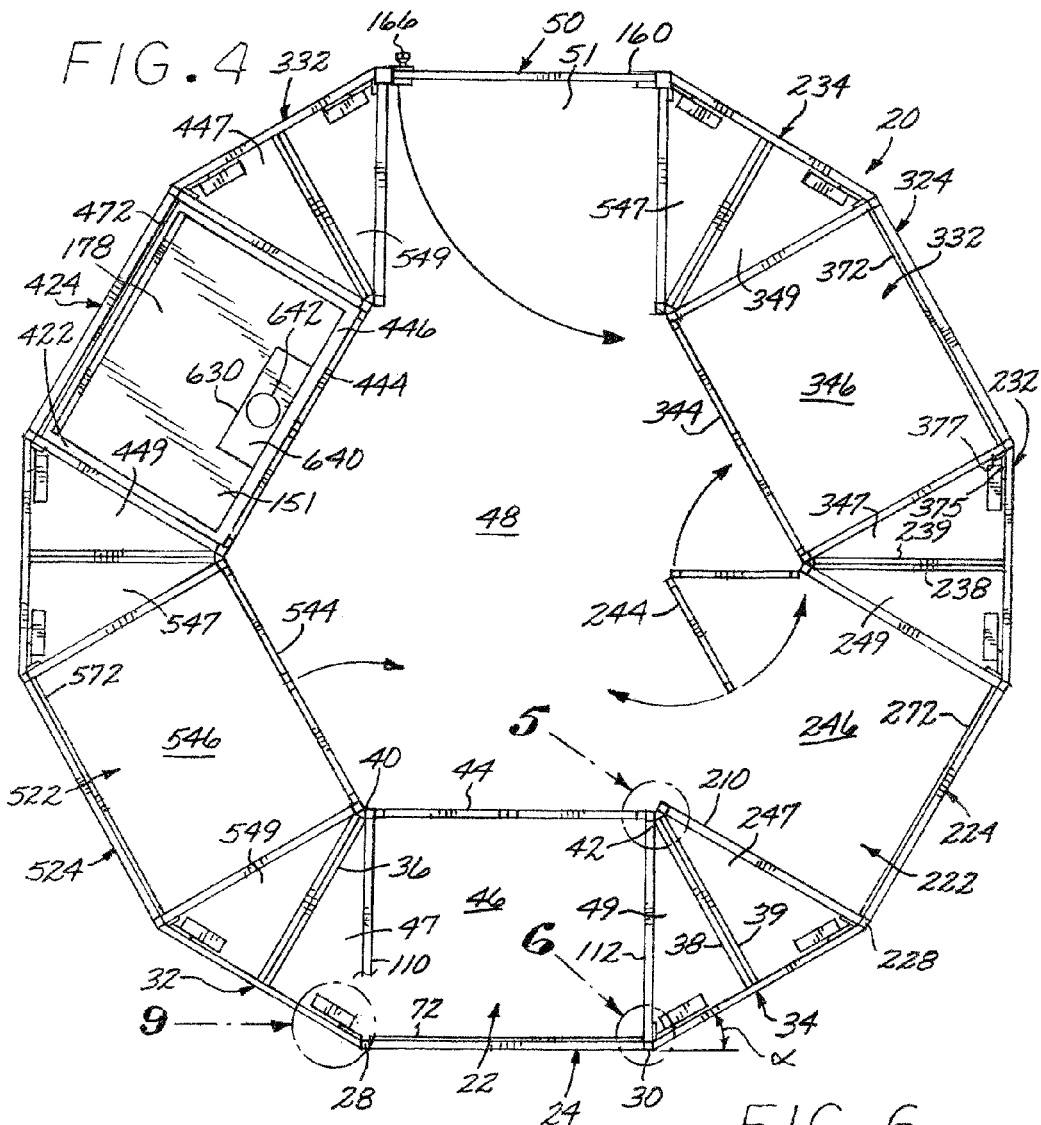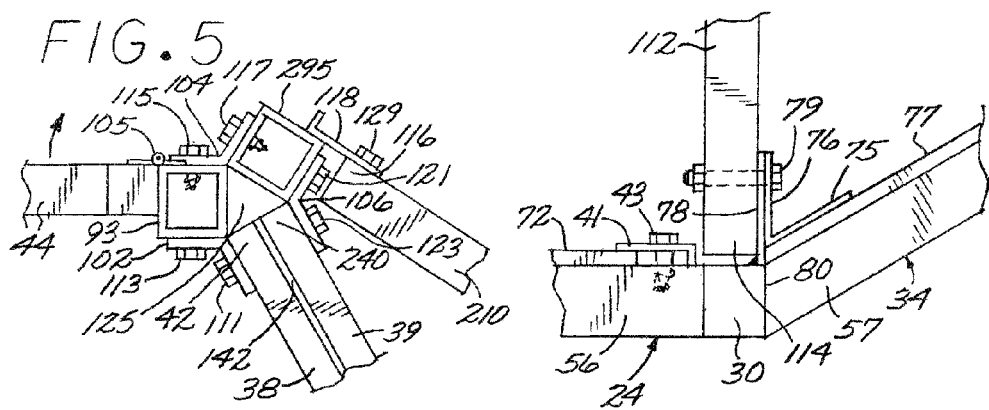

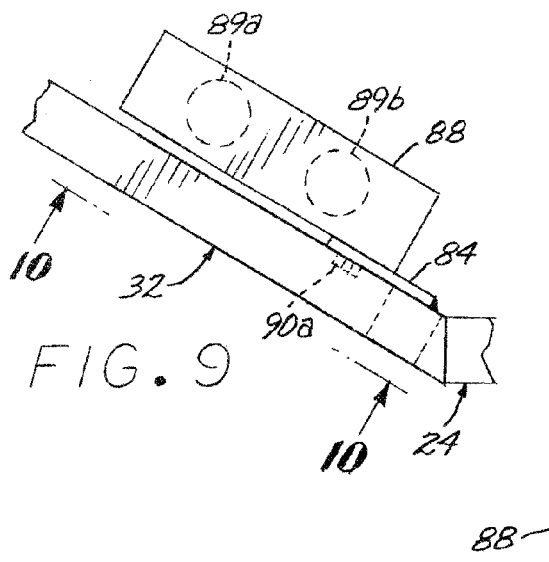
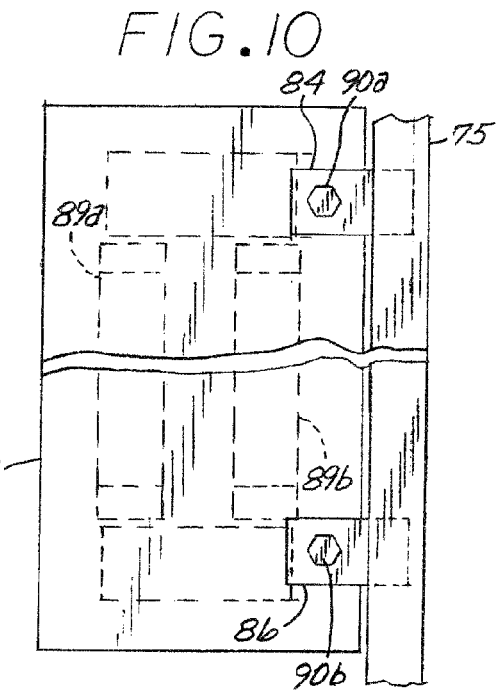
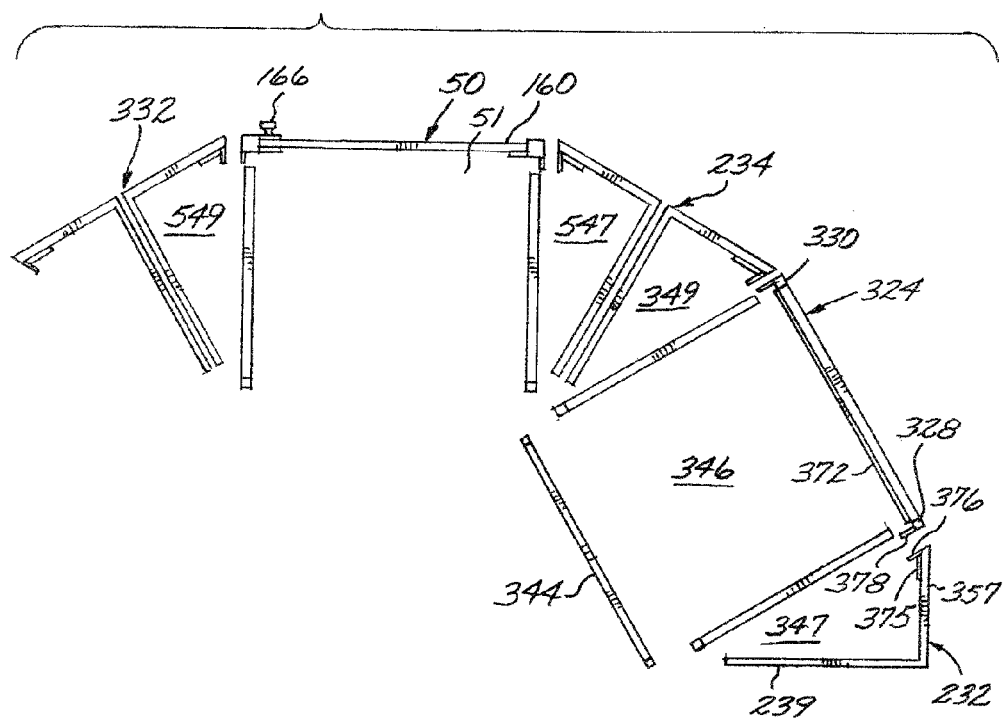

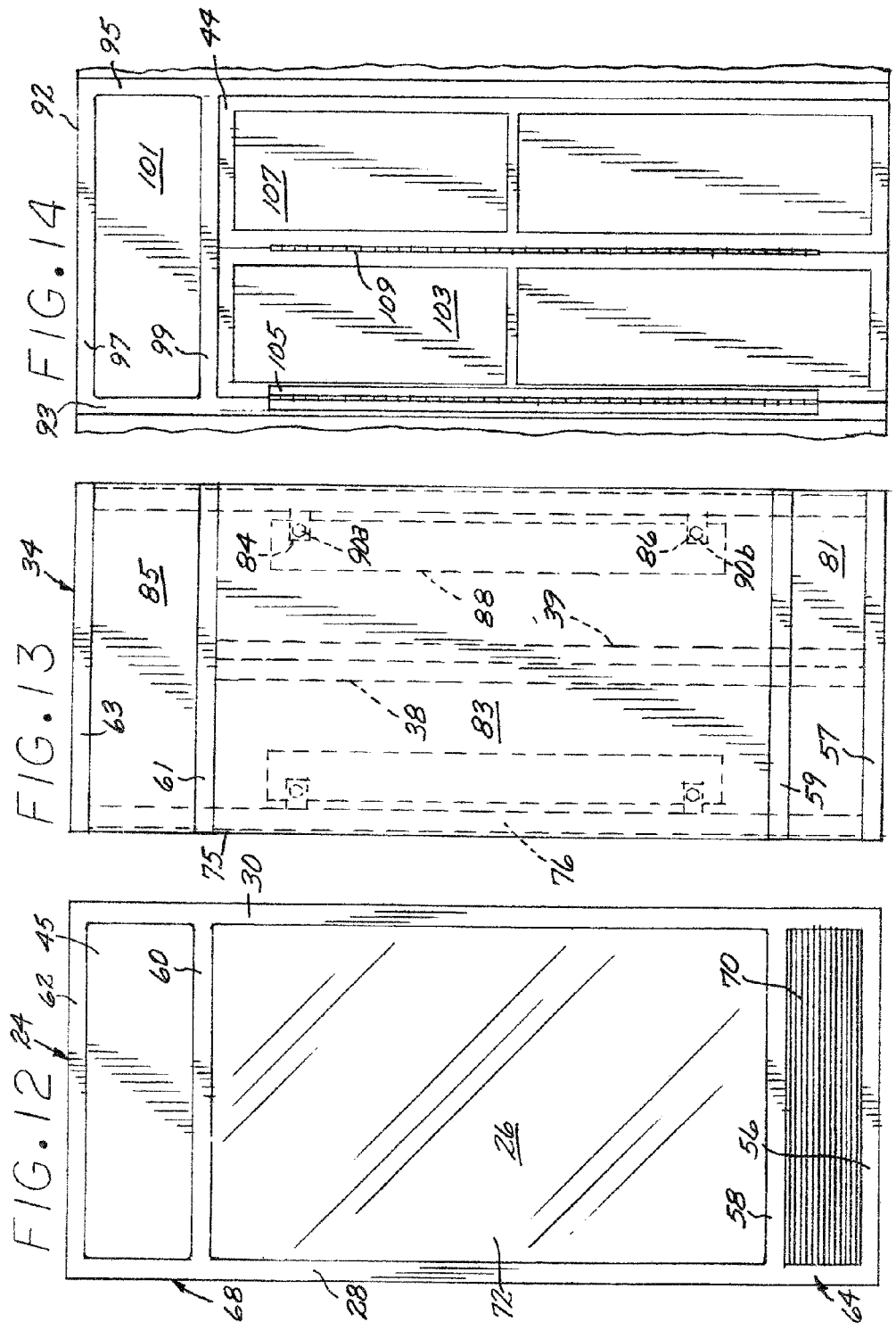

ANIMAL DISPLAY AND HABITAT ASSEMBLY

This is a continuation-in-part application of U.S. Ser. No. 10/915,526, now U.S. Pat. No. 7,174,851, filed on Aug. 10, 2004, entitled Animal Display and Habitat Assembly, which is incorporated by reference in its entirety.

FIELD OF THE INVENTION

The present invention relates to the field of display devices, and more specifically, to display devices including a habitat for showcasing birds, reptiles, amphibians, small mammals, and other animals commonly sold in retail or specialty pet stores and providing environmental control of such habitat.

BACKGROUND OF THE INVENTION

In the pet wholesale and retail industries, maintaining the health of the animals such as birds, small mammals, fish, reptiles, and amphibians waiting to be sold is a paramount consideration. One such health maintenance concern involves reducing the impact of one sick animal from spreading to others nearby. Thus, in many instances, the animals requires isolation from one another, particularly wherein development of airborne contagions such as those common in birds may occur. Along these lines, it is often preferable to manage any cross contamination of the air in the various animal cages. Another health maintenance concern is providing a habitat that is comfortable for the animal. Some animals are preferably kept in groups while others prefer a more solitary habitat.

In addition to health maintenance, another significant consideration for the wholesaler or retailer is creating a display of the animals to entice sales. For example, enabling observation of the animals in a naturally simulated environment, providing information nearby about the animals being observed, and reducing odors emanating from the habitat produced by animal droppings or meals factor heavily in creating a display as well. Reducing allergens and animal dander produced by the animals is also a consideration. Another significant concern is the security of the animals and any structure housing the animals should take this into account. This is particularly important with exotic species of birds and reptiles with costs ranging anywhere up to tens of thousands of dollars. As a number of animals are typically maintained in one site or section of the store and their respective habitats may take up significant floor space, blending these health and marketing considerations into a satisfactory solution is often challenging.

A wide variety of animal display devices have been developed, although many sacrifice one or more of the foregoing considerations and emphasize others. For example, birds are often displayed in open air cages near heavy traffic locations in the Store. Such cages may be unlocked or have a simple lock to prevent customers from opening the cage. However, the bird is exposed to the ambient air and allergens and dander are not controlled. In addition, the birds in these settings are often removed and stored in a more secure cage at the end of the shift thus further adding to the animal's discomfort.

Another common pet store set up involves dedicated built-in rooms for larger and more exotic birds that may have large a glass panel and an employee entrance in the back. These open air rooms typically do not reduce odors, airborne contaminants, or allergens produced by the animals and thus the customers and employees may suffer. In addition, typically the rooms are not well isolated and one sick animal may contaminate a number of animals in close contact, particularly in the situation where the air is shared. The environment surrounding the animals is also unpredictable and thus the animal's health may be a concern.

Reptiles, amphibians, and fish are often maintained in glass enclosures (tanks) that are stacked on shelving units. Each tank or series of tanks may have its own or common light source and common environmental control system. In addition, these tanks are typically exposed to the same ambient air. Also, these animals often have more significant environmental control concerns such as heating, air supply, and lighting and require more stable environment to improve the animal's chances of living a long and healthy life.

As for the marketing concerns, store inventory and internal appearance frequently change, and thus the built-in rooms offer little in the way of adaptability. In order to build a new habitat in another location of the store, additional rooms must be constructed and the old ones may have to torn down. Also these rooms are typically located off to the side and away from the primary foot traffic and thus do not prominently display the animals.

For those displays that do locate animals in the heavily trafficked areas of the store, the presentation of the animals in a pleasing manner while providing security for the animals also presents a challenging solution as some animals are not particularly suited to lots of customer interaction and crowd access may present a problem. In addition, it is often desirable to locate the animals at an off site location such as at a trade show or other public appearance. In those cases, it would be advantageous to have a readily transportable assembly that somewhat resembles the habitat in the retail setting to reduce a change of environment impact on the animals.

In addition to the foregoing, animal display cases often include a series of tanks or cages stacked on individual shelving units. Typically, ambient air is introduced into the tanks by surrounding environmental factors such as heat or wind or otherwise forced into the tanks using a blower device. However, the stale or stagnant air is not always drawn out of the tanks. This is usually detrimental to the animals. A greater concern is the sharing of habitat air, that is, the air that has been exposed to the animals in their tanks, between animals in separate habitats. Cross contamination of an infected or diseased animal or animals highly sensitive to their surroundings due to shared habitat air flow demands that the air entering and exiting the animal habitats be regulated in some manner to reduce the likelihood of such an occurrence.

As many of the animals on display are costly to maintain, various attempts have been made to control the environment in which the animals are kept, particularly with respect to air flow control. One early attempt may be found in U.S. Pat. No. 4,365,590 to Ruggieri et al. This patent describes a ventilated animal cage rack, primarily for use in a laboratory setting, in the form of a hollow housing divided into a number of horizontally disposed shelf compartments separated from each other by partition walls and having openable front ends that are normally closed off with transparent doors that may be lifted up and slid back above the top of the compartment. The doors isolate the interiors of the shelf compartments from each other and from the interior of the room containing the cage rack. Each shelf compartment is sized to contain a row of horizontally spaced animal cages having open top ends and closed bottom ends. The open top ends are spaced will below the ceiling of the shelf compartment.

Further according to the Ruggieri et al. patent, a low pressure air plenum extends vertically along one side of the cage rack and communicates with one side of each of the shelf compartments. The other sides of the shelf compartments include air inlet openings communicating with the room interior thereby providing a low pressure negative air flow along the top open ends of the contained animal cages to the air plenum and then to a room exhaust system.

While, according to the Ruggieri et al. patent, this air flow system effectively isolates the animals from the room environment in which the rack system is located and eliminates animal odors and protects the laboratory personnel from animal dander and allergens that would otherwise be introduced into the room, this air flow system suffers from several drawbacks. As each of the cages (six are pictured) on a particular rack are open topped and the air flow is directed across the top of each cage, there is a definite cross contamination between cages on the same rack. Thus, the animals on each rack are not isolated from one another. This would be very costly should a single animal on one rack develop a contagious disease, especially those of the airborne variety. In addition, the air flow described in this patent is unidirectional from the inlet end through the compartment and into the outlet of the compartment into the negative air flow plenum. Thus, odor and other airborne contaminants from any one cage will pass over and mix with the odor and airborne contaminants of all downstream cages. Moreover, the exhaust air from individual racks is dumped into a single plenum right next to the rack outlet. Air drawn from the lowermost outlet passes over all of the rack outlets downstream (above in this case) and thus introduces another layer of potential cross contamination. The latter example of cross contamination occurs between cages on different racks and not just individual cages located on the same rack.

Another ventilated cage and rack system is described in U.S. Pat. No. 5,954,013 to Gabriel et al. According to that patent, the system is constructed to maximize cage density. The rack includes an air exhaust plenum and a canopy disposed within the rack. The canopy supports a first cage within the rack above the canopy and also positions a second cage below the canopy so as to maintain a gap between the top of the second cage and the canopy to permit air to be drawn in to the air exhaust plenum from the interior of the second cage through the top of the second cage and also to permit ambient air to be drawn across the top of the second cage into the air exhaust plenum from the front face of the rack. In addition, an air supply plenum attached to a blower is connected to the opposite end of the rack to force air into each cage.

According to the Gabriel et al. patent, each cage includes an inlet coupled to an air inlet nozzle projecting from the air supply plenum. Each cage is slidably supported on the canopy which is an upside down channel shaped bracket with lower flanges to support a rim of a cage. In effect, the rear side of each cage is plugged into the air supply plenum and disposed near the exhaust duct.

The top of each cage may incorporate a filter hood with slots wherein air from the cage may exit under pressure of the blower. This cage air is then drawn across the top of the filter hood and beneath the canopy into an exhaust duct that is connected to a vacuum source. In addition, under influence of the vacuum source, ambient air is pulled across the filter hood as well and into the exhaust duct. However, air escaping through the top of each cage freely travels a significant distance before entering the exhaust duct without being contained. Thus, this system relies heavily on the vacuum source to contain the exhaust air emanating from the top of each cage. Random fluctuations in the incoming ambient air or within the vacuum ducting may cause the exhaust air to readily escape into the surrounding environment or other nearby cages. Cross contamination is not inhibited in such scenarios.

Another example of a ventilation system may be found in U.S. Pat. No. 6,457,437 to Frasier et al. This system incorporates a blower element to introduce fresh ambient air into the individual animal cages. The forced air passes through a flow control valve and is introduced into each cage through a rear inlet. The air inside the cage is then forced out through a removable top mounted air filter into an outlet plenum. According to the patent, each row of stations has the outlet plenum immediately above the row. Thus, air forced out through a cage filter drifts across other filters in the common row as is similar to the exhaust ducting in the Gabriel et al. patent discussed above and introduces similar cross contamination concerns on the exhaust side of the ventilation system.

Thus, what is needed and heretofore unavailable is an animal display system having ventilation capabilities to prevent the mixture of stale air in individual animal habitats with the stale air from other closely located animal habitats prior to or after exiting the display or habitat area to significantly reduce or remove cross contamination concerns.

SUMMARY OF THE INVENTION

In accordance with a preferred embodiment of the present invention, a ventilated animal habitat is provided with a frame with at least one shelf supporting an animal enclosure defined by a number of cooperating surfaces and surrounding a volume of habitat air, one of the enclosure surfaces including a ventilation control region with an ambient air inlet and an exhaust air outlet having a defining perimeter that is surrounded by an entry mouth of an exhaust air collection chamber of a ducting system also supported by the frame and abutting the surface containing the ventilation control region. A remote vacuum source may be provided and in communication with the exhaust air collection chamber by a carry away duct and is operable to remove habitat air from the enclosure into the air exhaust collection chamber and introduce fresh ambient air into the enclosure through the inlet under negative pressure.

In another embodiment of the present invention, the frame is in the form a wheeled roll unit and includes multiple shelves and enclosures with the ventilation control region of each enclosure including a dedicated air collection chamber.

Another aspect of the present invention provides a common collector chamber in communication with a plurality of exhaust air collection chambers and the vacuum source.

Another characteristic of the present invention is the location of the ambient air inlet and exhaust air outlet in a common enclosure surface.

Another facet of the present invention is the adaptability of the animal habitat to be used in conjunction with preexisting building exhaust systems thus providing a measure of portability and ease of set up and take down.

Other aspects of the present invention will become apparent with further reference to the following drawings and specification.

BRIEF DESCRIPTION OF THE DRAWINGS

FIG. 1 is a forward perspective of an animal display and habitat assembly in accordance with a preferred embodiment of the invention;

FIG. 2 is a front elevation view, in reduced scale, of the animal display and habitat assembly of FIG. 1;

FIG. 3 is a rear elevation view, in reduced scale, of the animal display and habitat assembly of FIG. 1;

FIG. 4 is a top plan view, in reduced scale, of the animal display and habitat assembly of FIG. 1 with the ceiling panels, environmental control sections, and internal access door frames removed;

FIG. 5 is a close up sectional view, in enlarged scale, of an assembly joint taken from oval 5 of FIG. 4;

FIG. 6 is a close up sectional view, in enlarged scale, of an assembly joint taken from oval 6 of FIG. 4;

FIG. 9 is a close up view, in enlarged scale, of a light source mounting assembly taken from oval 9 in FIG. 4;

FIG. 10 is a close up view, in enlarged scale, of the light source mounting assembly taken along lines 10-10 of FIG. 9;

FIG. 11 is a partial sectional exploded top plan view of the animal display and habitat assembly taken from FIG. 4;

FIG. 12 is a similar view as in FIG. 2 of the central frame, in enlarged scale;

FIG. 13 is a front elevational view of an exemplary transition member, in enlarged scale, of the animal display and habitat assembly of FIG. 2 with phantom lines illustrating the lighting mounting assembly;

FIG. 14 is a sectional rear elevational view of a compartment access door, in enlarged scale, of the animal display and habitat assembly of FIG. 1;

DETAILED DESCRIPTION OF THE PREFERRED EMBODIMENTS

Figure 7:
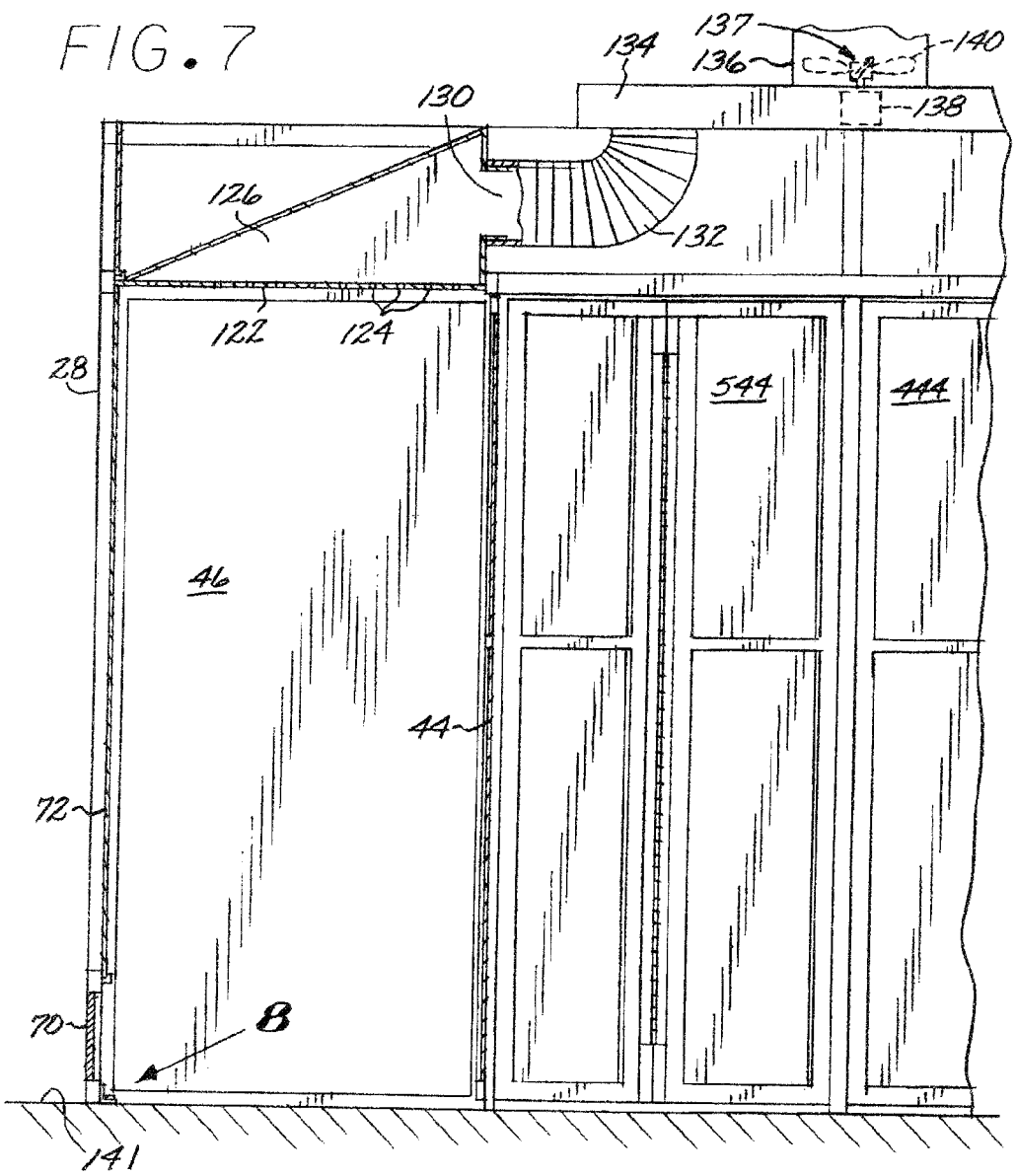
FIG. 7 is a sectional side view, in enlarged scale, taken along lines 7-7 of FIG. 2.

Referring now to FIGS. 1, 2, and 4, an animal display and habitat assembly, generally designated 20, may provide a convenient housing for a number of animals such as birds, reptiles, amphibians, and small mammals for display in a retail or wholesale setting. The animal display and habitat system generally includes a number of modular animal display units, generally designated 22, each having an outwardly facing frame 24 with a transparent viewing section 26 positioned between a first upright frame member 28 and an opposing second upright frame member 30 that are connected to a corresponding first transition member 32 and a corresponding second transition member 34, respectively. The first and second transition members further include inwardly projecting sections 36 and 38, respectively, that provide opposing door jambs 40 and 42, respectively, across which an access door 44 coupled to one of the door jambs may span such that the frame, transition members, and access door cooperate to define an display compartment 46 through which animals may be viewed by the customers and which serves as the animal's habitat. A number of modular display units 22, 222, 322, 422, 522 may be connected together to form a common access area 48 interior to each of the access doors 44, 244, 344, 444, 544. Thus, from the common access area, an individual may access any one of the display compartments 46, 246, 346, 446, 546.

The animal display and habitat assembly 20 is generally a set of easy to assemble modular display units 22, 222, 322, 422, 522 that may provide a flexible display layout suitable for various allocations of available floor space. One such exemplary display as illustrated in FIGS. 1-4 includes five separate animal display modules 22, 222, 322, 422, 522 and a security door module 50 surrounding the central common access area 48. An exemplary display module 22 includes an animal display compartment 46 with a left support compartment 47 and a right support compartment 49, as viewed from above in FIG. 4 with the animal display compartment 46 centered. The support compartments may be formed by one half of the section laterally disposed transition members 32 and 34. While display module 22 is primarily described, other display modules 222, 322, 422, 522 may be constructed identically and throughout this description like components in other modules are numbered alike.

For example, moving counterclockwise around the animal display and habitat assembly illustrated in FIG. 4, display module 222 includes animal display compartment 246, left support compartment 247 and right support compartment 249. Likewise, display module 322 includes animal display compartment 346 and left support compartment 347 and right support compartment 349. Skipping over the security door module 50, display module 422 includes animal display compartment 446, left side support compartment 447, and right side support compartment 449. The fifth display module 522 includes animal display compartment 546, left side support compartment 547 and right side support compartment 549. The security module inserted in the display module ring between the third and fourth display module units 322 and 422, respectively includes a foyer 51 bordered by a left compartment 547 and a right side compartment 549 from transition member 234 and 332, respectively. The construction of the display module units will now be described in more detail using display module 22 as an example.

Referring now to FIGS. 2, 4 and 12, the display module 22 includes a rectangularly shaped display frame 24 as defined by a left upright 28 and a right upright 30 spaced apart by equal length transverse members including a bottom transverse member 56, a lower intermediate transverse member 58, an upper intermediate transverse member 60, and a top transverse member 62. These transverse members divide the outwardly facing surface of the display frame into three rectangular sections. A grill section 64 is positioned between the bottom transverse member 56 and the lower intermediate transverse member 58. The viewing section 26 is disposed between the lower intermediate transverse member 58 and the upper intermediate transverse member 60. This viewing section is the primary means through which customers can view the contents of an animal display compartment (habitat) 46.

An environmental control section 68 is positioned between and behind the upper immediate transverse member 60 and the top transverse member 62. Each of the uprights and transverse members are preferably constructed of rectangular tubular steel or steel alloy. However, other suitable metals such as aluminum, aluminum alloy or other materials such as plastic or wood may also be used. Preferably, these tubular members are cut at ninety degrees angles so that each upright member meets each transverse member at a right angle for ease of manufacture as well. The uprights and transverse members are preferably welded together but may be fastened using suitable conventional fasteners such as bolts if further breakdown of the frame is desired. The corners where respective transverse members meet with the uprights may also be rounded if desired.

The grill section 64 includes a vented grill 70 that provides a passage for ambient air to be drawn into the animal display compartment 46 under a negative pressure environment. The viewing section 26 includes a sheet 72 of sturdy, impact resistant, safety glass, plexiglass or other suitable transparent viewing material so that any animals inside the display compartment may be observed by the store employees and customers. In this exemplary display frame 24, the sheet 72 extends between the left and right uprights 28, 30 and the lower intermediate transverse member 58 and the upper transverse member 60. The sheet may be secured between a set of inwardly projecting flanges (not shown) built into the uprights or transverse members that the sheet may slidably fit into or, alternatively, clamped onto the uprights (FIG. 6) using a clamping flange 41 secured by a bolt 43 into the uprights or transverse members and is preferably recessed from the outermost surface of the uprights. Advantageously, the clear sheet provides a large viewing surface. Also, advantageously, the grill section 64 extends outwardly beyond a plane passing through the sheet to prevent shopping carts commonly used in retail settings from bumping the glass.

The environmental control section 68 incorporates a translucent or opaque plastic panel 45 to conceal any ducting used to draw air through the animal display compartment 46 through the grill 70 as will be described below in more detail. This section may also slant upwardly and inwardly from the face of the viewing section. Conveniently, anywhere a plastic panel is used throughout the display and habitat assembly 20, advertising or information about the animals in the nearby compartment or scenery may be incorporated.

With continued reference to FIGS. 1, 2, 4, and now FIG. 13, the left transition member 32 that separates adjacent display frames 24 and 524 and the right transition member 34 that separates adjacent display frames 24 and 224 are constructed identically for ease of manufacture. The right transition member 34 (as viewed in FIGS. 1, 2, and 4) will now be described. As viewed from the exterior of the assembly, the right transition member appears to be similarly constructed to the frame 24, that is, the right transition member includes a bottom transverse member 57, a lower intermediate transverse member 59, an upper intermediate transverse member 61, and an upper transverse member 63 dividing the transition member into a lower panel section 81, a middle panel section 83, and an upper panel section 85. The opposing free ends of the each of the transverse members 57, 59, 61, and 63 are beveled as will be explained in more detail below. Each of these three sections may includes a panel inserted between the respective transverse members that, like the panel 45 of the environmental control section 68 of the frame 24, may include advertising or other information displayed prominently thereon. While FIG. 1 displays a pair of uprights to either side of the transverse members of the transition member similar to the construction of the frame 24 and which would impart additional rigidity to the transition member, this is an optional construction and the preferred construction is illustrated in FIGS. 4 and 13 to reduce the overall amount of material required to construct the assembly.

Referring now to FIGS. 4 and 13, the transverse members 57, 59, 61, and 63 of the right transition member 34 are welded at right angles to an inwardly extending first divider leg 38 and a second inwardly extending divider leg 39. Other suitable connector means may be used. The divider legs are open frame-like structures extending toward the common access area. When viewed from above (FIG. 4), the right transition member includes a first L-shaped frame including one half of the transverse members 57, 59, 61, and 63 and the divider leg 38 connected back to back with a second L-shaped frame provided by the other half of the transverse members and the divider leg 39. A first section of each L-shaped frame is provided by the transverse members while a second section is provided by the respective divider leg. These two sections are welded at right angles to one another. In this exemplary construction, the transverse members connect both divider legs. However, it will also be appreciated that two separate L-shaped frames could be joined, welded, or otherwise coupled together to construct a transition member. In addition, a single generally L-shaped transition member having an outwardly facing base section (i.e. the transverse members) and a single divider leg may be used alone as a transition member for connecting multiple frames as opposed to the T-shaped transition member illustrated in FIG. 4.

Referring back to FIGS. 1 and 13, the transverse members 59 and 61 are spaced apart to form a rectangular open frame that may conveniently receive an outwardly facing advertising panel 75 that may be secured to the transverse members using clamping components as with the sheet 70 above or other suitable retainer. Preferably, the advertising panel 75 is relatively easy to remove as advertising frequently changes. This panel may also be used to provided printed information about the inhabitant of the adjacent compartment 46 or provide a motif for the assembly such as a forest, jungle, desert or aquatic scene. Likewise, advertising and information panels may be inserted between transverse members 57 and 59 or transverse members 61 and 63. These panels may merely be used to conceal the construction of the assembly providing a more aesthetically pleasing appearance as well.

With reference to FIGS. 4 and 6, the connection between an exemplary transition member 34 and an adjacent frame 24 will now be described. The beveled free end 80 of transverse member 57 of transition member 34 for connecting to an adjacent frame upright 30 is cut at or formed with an angle and includes an inwardly projecting flange with a first flange leg 75 welded to the interior surface 77 of the transverse member 57 and a second flange leg 76 that is angled inwardly from the first flange leg so that it may lay flush up against an inwardly projecting upright anchor flange 78 of the upright member adjacent thereto when assembled (FIG. 6). The upright anchor flange projects inwardly at the height of the lower transverse member 56 to align with the second flange leg 76 of the angled flange of the transition member. A bolt 79 may is then be used to secure the anchor flange with the angled flange and thereby secure the transition member and frame together.

The free ends of the other transverse members 59, 61, and 63 are identical and aligned to butt up flush against the upright 30 opposite their respective corresponding transverse members 58, 60, and 62 of the frame 24 and align their respective angled flanges with the corresponding anchor flange aligned with each transverse member 58, 60, and 62 of the frame 24. Thus, for each frame and transition member connection, there are four sets of opposing anchor flanges and angled flanges that are bolted together. This is merely an exemplary number and more or less flanges may be used if desired. For example, as pictured in FIG. 13, the angled flange 76 projects from the top to the bottom of the transition member as opposed to being four discrete flanges. With such construction, the bolt holes of the angled flange are aligned with the corresponding anchor flanges of the frame 24. A similar single anchor flange may be used if desired.

An exploded view of like components for display module 322 and the alignment of the angled flange 376 projecting from the beveled free end of transverse member 357 with the upright anchor flange 378 projecting from upright 328 is shown in FIG. 11. The angled flange may either be an inwardly projecting extension from the end of the base section that is welded thereon or alternatively may in the form of an angled bracket as shown in FIGS. 6 and 11. The components of the transition members are preferably constructed of similar material to the frame 24.

Referring back to FIG. 4, the innermost end of the divider leg 38 provides a doorjamb 42 disposed proximate a plane passing through the upright anchor flange 78. The L-shaped section of transition member 34 also forms a side support compartment 49 to the main compartment 46 into which equipment such as lighting equipment may be mounted. With reference to FIGS. 4, 9, 10 and 13, an exemplary lighting arrangement in left side compartment 47 is illustrated with upper mounting flange 84 and a lower mounting flange 86 projecting inwardly along the inner surface 75 of the angled flange at a convenient location. The angled flange has been removed from FIG. 9 to simplify the drawing. A light source 88 such as a fluorescent lamp assembly with a pair of fluorescent lamps 89a, 89b is secured using a pair of bolts 90a, 90b to the upper and lower mounting flanges and disposed to cast light into the compartment 46 and corresponding side support compartment 47. The light source may provide both a back lighting to the outwardly facing advertising panel 75 as well. A lighting assembly may be placed in each support compartment (49, 247, 249, 347, 349, 447, 449, 547, 549, 647, 649) if desired. Power for the lighting assembly may either be provided from a nearby electrical outlet or may be battery powered.

The opposing left upright member 28 is connected to the left transition member 32 in a like manner with the left and right transition members 32, 34 being mirror images of one another about the display frame 24 as viewed in FIG. 4. The inwardly extending divider leg 36 of the left transition member 32 terminates in an opposing doorjamb 40.

Turning now to FIGS. 4 and 14, an access door 44 of the first display module 22 is illustrated as viewed from common access area 48. Surrounding three sides of the access door 44 is a door frame 92 include an upright left door support 93 and an upright right door support 95. An upper cross member 97 and lower cross member 99 join the door supports at right angles and provide a generally rectangular shaped door frame. A panel 101 may be inserted between the cross members to conceal the environmental control ducting or may be left open to provide passage for the ducting out of the upper section of the compartment as will be discussed below in more detail. The door supports and cross members are preferably constructed similarly to the frame uprights and transverse members.

With continued reference to FIG. 14, the access door 44 includes a first panel 103 coupled to the left support 93 with a piano hinge 105 and a second panel 107 coupled to the first panel with a second piano hinge 109. The right hand end of the access door as shown in FIG. 14 may merely abut the right door support 95 or the door may include a locking or latching mechanism at a convenient location to maintain the door in a closed position. The access door opens away from the compartment 46 and its two sections may be folded up against one another and against an adjacent access door such that the door frame is completely open. If desired, a conventional door seal (not shown) positioned between the margin of the folding access door and the door frame may be used to provide a better seal for the animal display compartment 46. Seals may also be used beneath each display frame and transition members to compensate for any imperfection between the lower edge of the display frame and transition members and the underlying support surface 141. A conventional seal may be used.

Turning now to FIGS. 4, 5, and 14, several assembly components converge and are joined together using suitable fasteners such as bolts although other suitable fasteners could be used. As shown in FIG. 5 illustrating a junction between the right transition member 34 and the right side of the access door 44 (as viewed in FIG. 4), the upright door support 93 of the door frame 92 is coupled to the right doorjamb 42 with an angled connector bracket 102 with one arm bolted 111 to a laterally facing side of the door jamb 42 and the other arm bolted 113 to a forwardly facing side of one end of the door support 93, that is, the side facing into the display compartment 46. The right door support 93 and an adjacent door support 295 of an adjacent access door 244 are also connected together using a similarly constructed angled door frame connector bracket 104 that includes one arm bolted 115 to the inwardly facing side of one door frame support 93 and the other arm bolted 117 to the inwardly facing side of one end of the adjacent door support 295. The adjacent door support 295 is then bolted to a doorjamb 240 on an adjacent transition section 39 with another angled connector bracket 106 using a similar pair of bolts 121, 123. This junction forms a triangular open space 125 between the ends of the adjacent door jambs 42, 240 and the adjacent door support 93, 295. While only one set of angled brackets 102, 104, 106 are shown, preferably an upper set positioned about two-thirds of the height of the door frame and a lower set positioned about one-third of the height of the door frame are used. This multi-joint as illustrated in FIG. 5 is repeated around the assembly where two adjacent access doors meet the divider legs of a transition member. It will be appreciated that the door frames may be omitted if desired and the access doors may be coupled directly to the door jambs using conventional fasteners. Thus, the access door may be hingedly coupled to one of the door jambs directly.

For a display module such as exemplary display module 22, a set of components including the display frame 24, left and right transition members 32, 34 and access door 44 cooperate to, when assembled, define an animal display compartment 46 that generally includes a main rectangular animal habitat with two opposing triangularly shaped support compartments 47, 49 as provided by the left and right transition members. Optionally, the support compartments may be partitioned off from the animal habitat with a separator panel 110, 112. Referring to FIG. 6, an exemplary connection of the forward end 114 of a separator panel 112 is illustrated. The forward end 114 of the panel 112 may be secured to the inside of the display frame flange 78 using conventional fasteners (such as the bolt used to secured the angled flange to the frame flange) at the same time as the angled flange 76 is connected to the anchor flange 78. A longer bolt 79 may be used if necessary with this connection. Referring now to FIG. 5, an exemplary connection of an inner end 116 of a connector panel 210 is illustrated. The inner end 116 may be bolted 129 to an L-shaped bracket 118 that is also welded to a surface of the door frame support 295 (FIG. 5). The separator panels 110, 112 may be clear or translucent to diffuse the light from the light source 88 and effectively cooperate with the frame 24 and access door 44 to seal off the support compartments 47, 49 from the main animal habitat 46. With opposing separator panels in place, the animal habitat is walled off from the adjacent support compartments. As an alternative, an open frame constructed similarly to the display frame 24 could be connected between one end of the display frame and the corresponding side of the door frame leaving both side support compartments accessible from the main habitat 46. This habitat enclosure 46 may include accoutrements for the animals such as a perching tree 131 or an upper rear perch 133 or forward perch 135 as for example may be used for birds (FIG. 1). The underlying surface 141 of the display compartment 46 may be the flooring of the store or may be added as an insert such as a shallow tray to facilitate maintenance of the compartment.

Figure 15:
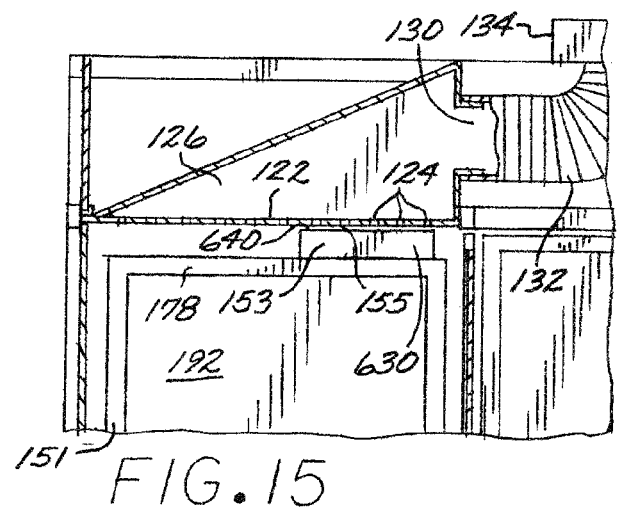
FIG. 15 is a close up sectional view illustrating the ducting system above a display compartment of the animal display and habitat assembly in conjunction with an alternative animal cage of FIG. 4.

With reference now to FIGS. 1, 7, and 15, above the top of the display compartment 46 is a ceiling 122 resting on the framework having a series of slots 124 for venting air from each compartment into a triangularly shaped collection duct 126 (FIG. 7) set above and supported by the ceiling that includes a rear outlet 130 coupled to a flexible ducting tube 132 that feeds into a collector 134 for all of the compartments 46, 246, 346, 446, 546. The collector leads to a main exhaust duct 136 that includes vacuum source 137 with a motor 138 and a fan 140. The main exhaust duct may be integrated into the building air control system such that air is vented externally to the building. Each compartment 46, 246, 346, 446, 546 preferably includes a collection duct in communication with the vacuum source 137.

The vacuum source 137 is constructed to create a slight negative pressure environment in the compartment 46. This will draw air through the grill 70 into the compartment, through the slotted ceiling 122 and into the exhaust duct 136. As each compartment 46, 246, 346, 446, and 546 is isolated from the other, cross contamination of the compartments does not occur. The air flow subsystem including the grill 70, slotted ceiling 122, collection duct 126, ducting tube 132, collector 134, exhaust duct 136 and vacuum source 137, and any seals used assists in keeping the animals healthy and isolated in case a contagion, particularly of the airborne variety, as is common in birds is developed. In addition, odors from droppings and foods, allergens, and dander are prevented from escaping to the customers on the outside of the compartment and is also kept away from the employees when working in the common access area. It is also contemplated to use filters in the grill 70 to filter incoming ambient air and at a position along the length the ducting to filter compartment air prior to its escape outside the building.

Referring to FIGS. 3 and 4, while the common access area may be entered by leaving a suitable gap between opposing open ended transition members, it is preferable to provide a security door module 146. The security door module includes an outwardly facing door frame 148 with left and right upright door supports 150, 152, respectively. The top section of the door frame is constructed identically to the top section of the display frame with a panel 154 between upper and lower transverse members 156, 158. A rectangular security door 160 with horizontal reinforcement bars 162, 164 is hingedly connected to one of the uprights. The other side of the door includes one part of a conventional locking component and door handle 166. The adjacent door frame upright includes the complementary locking component. For example, a cylinder lock openable with a key or a keypad may be used to secure the door. Thus, only employees with the key could enter the common access area. The exemplary security door is hinged on its left side as viewed in FIG. 3 and opens inwardly.

Referring back to FIG. 4, the display frame 24, left and right transition members 32, 34 and access door 44, and animal display compartment 46 form a modular animal display unit 22. A display assembly with multiple compartments or animal showcases may be formed by joining units together. Display module units 22 and 222 may be joined together by connecting a transition member 34, for example, between them. For example, the left hand end of the transition member 34 may be bolted to the right upright of 30 as described above. Then the right hand end of the transition member 34 may also be bolted to the left upright 228 of the next frame 224.

This assembly is continued until the desired number of compartments are established and different configurations may be established using more or fewer modules. The frames and transition members are arranged in an alternating relationship. The optional security module 50 is likewise coupled to transition members 234 and 332 and between display modules 322 and 422 to complete the outer ring assembly. In this exemplary embodiment, five separate display modules 22, 222, 322, 422, 522 and their respective compartments 46, 246, 346, 446, 546 and the security module 50 are provided in a twelve sided assembly. Then a ring of access doors 44, 244, 344, 444, and 544 are coupled to the interior door jambs as described above. The ring is open if the security door 160 is located on the exterior of the assembly as illustrated in FIG. 4. However, the security door 160 may alternatively be disposed in alignment with the ring of access doors and supported at the inner end of the security door module 50 so that the foyer 51 is open. A double set of security doors may also be used if desired. The outer frame and transition members are concentrically arranged around the ring of access doors with the divider legs providing the connection between the access door and outer framework.

Another optional feature is a partition 142 sandwiched between the back to back divider legs 38, 39 that effectively separates one support compartment 49 from an adjacent support 247 compartment. This partition may also be used to reflect light from the light assembly 88 back toward to the adjacent display compartment 46.

Figure 8:
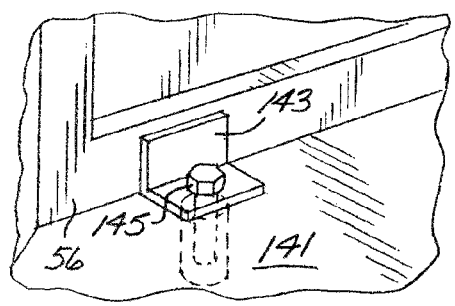
FIG. 8 is a close up view, in enlarged scale, taken along the direction of arrow 8 in FIG. 7.

Referring now to FIG. 8, while the weight of the typically metal structure is sufficient to inhibit the animal display and habitat assembly 20 from moving or being moved, in certain areas of the country prone to earthquakes and ground tremors, an optional L-shaped security bracket 143 may be welded to otherwise connected to the bottom inside edge of a bottom transverse member 56 on its upper leg and includes slot or aperture wherein a bolt 145 may be inserted and drilled into the underlying concrete 141 or support structure for added security.

When assembled, the access doors 44 face inwardly onto a common access area 48. In this exemplary embodiment, the common access area is approximately six feet across from one access door 344 to an opposing access door 544 but may be smaller or larger depending on the configuration selected by the assembler. By incorporating the folding access doors 44, the access area space is not obstructed when accessing a particular compartment. The common access area also provides sufficient space for an employee to work with the animal or remove the animal from the compartment to perform maintenance in the compartment. For example, the common access area could include an examination table, or grooming or nail clipping table.

It will be appreciated that the transition members may be constructed as an integral one-piece unit or be comprised of a number of section joined together to form the wedge shaped transition member. The exemplary construction discussed here is not meant to be limiting.

While the compartments 46 have generally been described in terms of a large animal habitat room, it will be appreciated that such compartment may be segmented off using partitions to display more animals. Such partitioned compartments may include a common ceiling or may be completely isolated from one another. In addition, a separate, preferably a conventional roll in unit 151 such as that shown in FIG. 4 in compartment 446 may be used. Such units typically include a series of shelves with tanks or cages placed thereon. The unit may includes its own dueling system 153 and exhaust outlet 155 that is abuts the ceiling panel 122 or, alternatively, is connected to the exhaust ducting above each compartment 46 using a suitable ducting component (FIG. 15). The ducting system may be easily removable such that the unit may be rolled into the common access area 48 through an access door 44 for maintenance and removal of the animals.

Figures 16, 17:
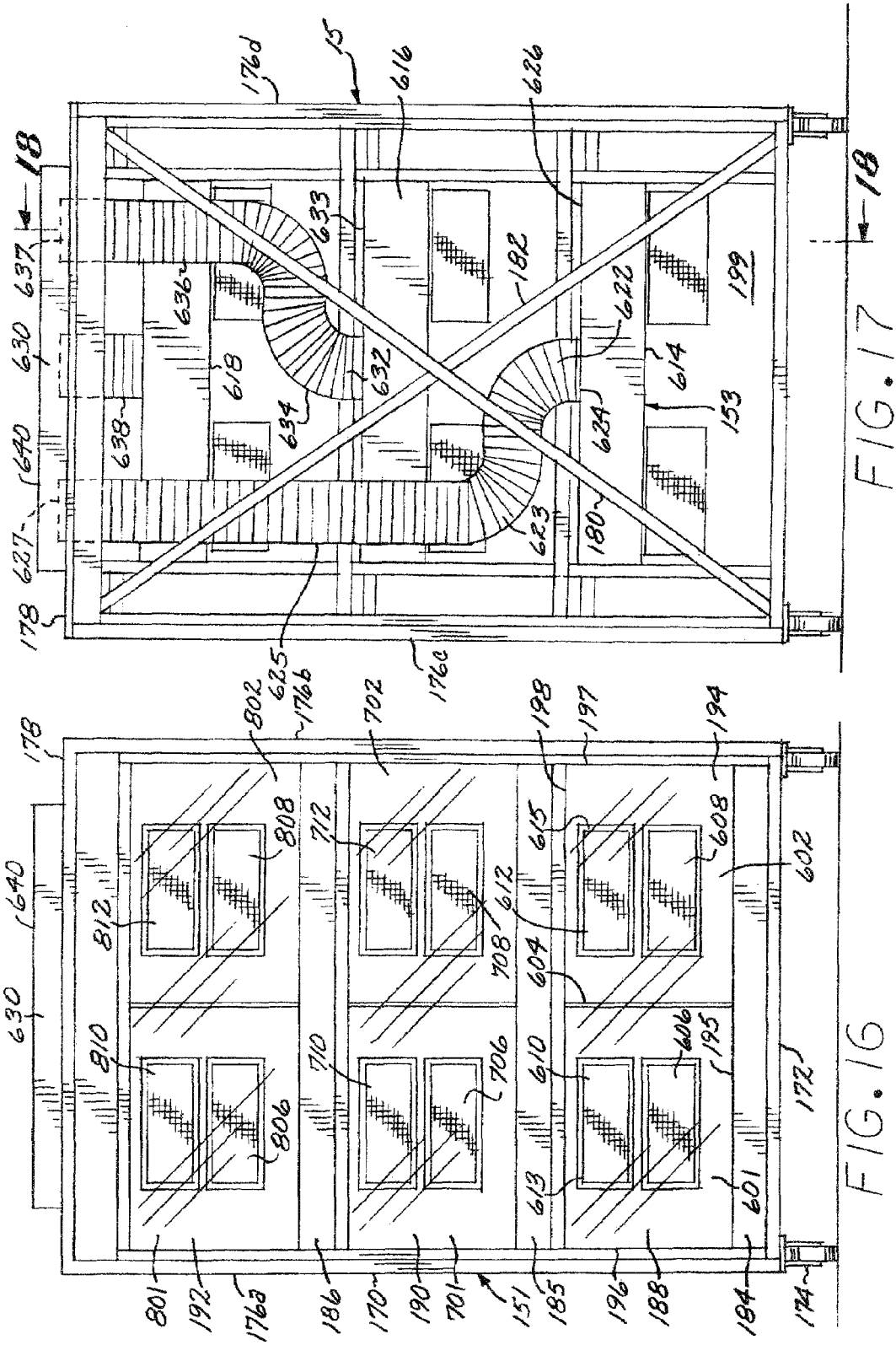
FIG. 16 is a front elevational view, in enlarged scale, of an exemplary roll unit illustrated in FIG. 4.
FIG. 17 is a rear elevational view of the roll unit of FIG. 16 illustrating the ducting system.
Figure 18:
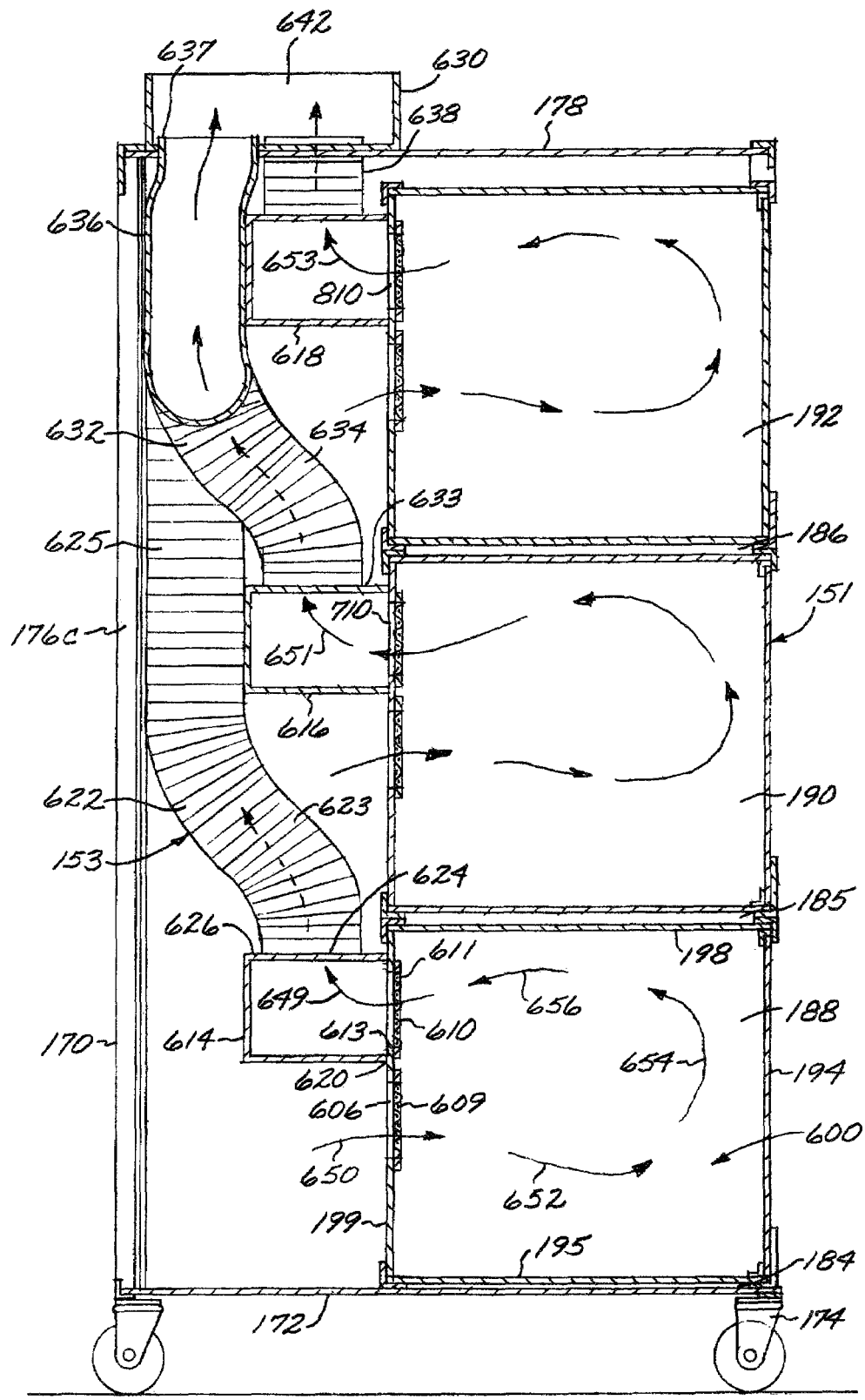
FIG. 18 is a left side elevational view, in enlarged scale, of the roll unit taken along lines 18-18 of FIG. 17.

More specifically, with continued reference to FIG. 4 and also turning to FIGS. 16-18, an exemplary roll unit, generally designated 151, in the form of a wheeled cart is provided with a ventilation system, generally designated 153, to control incoming and outgoing habitat air flow and reduce or eliminate cross contamination between individual animal habitats. Conveniently, the ventilation system is capable of being placed in communication with the overhead ducting of the animal display and habitat assembly or connected to pre-existing building ventilation ducting.

With continued reference to FIGS. 16-17, the roll unit 151 includes an open box, generally rectangular, metal framework 170 with a bottom transversely projecting support 172. A set of four caster wheels 174 are mounted to the underneath of the support 172 using conventional fasteners to facilitate rolling the cart into and out of any of the compartments, such as compartment 446 as shown in FIG. 4. A set of four uprights 176a, 176b, 176c, and 176d project upwardly from each corner of the bottom support and are connected at their respective upper ends to an upper frame top 178. As illustrated in FIG. 17, a pair of diagonal cross beams 180, 182 forming an "X" are connected between opposite rear corners of the bottom support 172 and frame top 178 and lend additional structural integrity to the frame. The open sections of the frame may be covered with panels if desired.

In this exemplary roll unit 151, there are three shelves 184, 185, and 186 supported by the framework 170 using conventional fasteners. The lowermost shelf 184 rests on the bottom support 172. The intermediate shelf 185 is located at about a third of the height of the cart from the bottom support and the upper shelf 186 is positioned at about two-thirds of the height of the cart from the bottom support. It will be appreciated that the shelf locations are exemplary and more or less shelves may be incorporated into the roll unit. The shelves are preferably slidably mounted to the uprights of the frame on extendible racks to form retractable drawers so that the animal habitats described below may be slid into and out of the frame for easy access to the animal compartments.

With reference to FIGS. 16 and 18, set on each shelf 184, 185, 186, respectively, is an animal habitat or compartment labeled 188, 190, and 192, respectively. Each habitat is in the form of a generally rectangular tank and spans the width of its respective underlying shelf as viewed in FIG. 16. Taking the lowermost habitat 188 as an example, the habitat includes a front wall 194 that is transparent to form a viewing window. The habitat includes a floor surface 195, a pair of opposing side walls 196, 197, and an upper ceiling 198. A rear wall 199 joined to the rearmost edges of the side walls, floor, and ceiling cooperates with the front wall, sides walls, and upper ceiling to define an interior animal habitat, generally designated 600 (FIG. 18). Typically, one of the enclosure surfaces or walls is moveable or removeable so as to gain access to the animal compartments.

In this example, the habitat is sub-divided into a left compartment 601 and a right sub-compartment 602 by an optional separator panel 604. The separator panel projects from the front wall 194 to the rear wall 199 and from the floor 195 to the ceiling 198 of the habitat seals to isolate the left compartment from the right compartment. The separator panel may be transparent or opaque and is preferably solid to prevent air from one compartment from flowing into the adjacent compartment. In this example, the rear wall 199 is common to both sub-compartments. However, it will be appreciated that the compartments may be spaced apart by more than the separator panel.

Starting with the left sub-compartment 601 as viewed in FIG. 16, the rear wall 199 of the habitat includes a rectangular ambient air inlet 606 located at about the middle third of the way up from the floor 195 of the animal enclosure 600 and allows ambient air to communicate with the habitat air inside the left sub-compartment 601. A porous material such as a screen or filter 609 preferably covers the inlet. A similar ambient air inlet 608 is located on right side of the rear wall 199 in the right sub-compartment 602. These inlets 606, 608 allow ambient air to enter into the respective sub-compartments 601, 602 to mix with the habitat air as will be explained in further detail below.

Still referring to FIGS. 16-18, positioned above and transversely aligned with the left-side ambient air inlet 606 is a left-side exhaust outlet 610 defined by a rectangular perimeter 613. The upper edge of the outlet perimeter is set a few inches below the ceiling 198 of the habitat 188. Like the inlet 606, a screen or filter 611 covers the outlet 610. A similar outlet 612 defined by rectangular perimeter 615 is positioned above the right side inlet 608 in the right sub-compartment 602. The intermediate and upper habitats 190 and 192, respectively, are constructed in similar fashion and like components are like numbered. For example, the intermediate habitat 190 includes left-side compartment 701 with inlet 706 and outlet 708 and right-side compartment 702 with inlet 708 and outlet 712. The upper habitat 192 includes left-side compartment 801 with inlet 806 and outlet 808 and right-side compartment 802 with inlet 808 and outlet 812. With these inlets and outlets sharing a common wall in this example, the rear wall acts a ventilation control wall to control flow access into and out of the sub-compartments.

To control the air flow provided to the animals and remove stale habitat air from the sub-compartments 601, 602, 701, 702, 801, and 802 on all three shelves 184, 185, and 186, respectively, while isolating the air flow between compartments, the rear mounted ducting system 153 is provided. The ducting system is supported from the rear framework using conventional fasteners. The exemplary ducting system includes a set of three first stage air exhaust collection chambers 614, 616, and 618 (FIG. 18) positioned behind their respective lower, intermediate, and upper rear wall outlet pairings 610, 612, 710, 712, and 810, 812, respectively. The first stage collection chambers provide temporary collection areas to hold habitat air being drawn out of the sub-compartments. Using the lower first stage collection chamber 614 as an example, the first stage collection chamber is a rectangular box-shaped receptacle with an opening facing the rear wall 199 of habitat 601 and terminating in a rectangular perimeter or mouth 620. The perimeter of the elongated mouth is large enough to cover both of the perimeters 613, 615 of the outlets 610 and 612 of the left and right sub-compartments, 601, 602, respectively. The foremost edge of the mouth abuts directly to the rear wall 199 and surrounds the perimeter 613, 615 of each outlet so that habitat air cannot escape between the rear wall and first stage collection chamber. It will be appreciated that an intermediate seal or gasket (not shown) between the forward most edge of the collection chamber and perimeter of the first stage collection chamber may be used to further reduce the escape of gases from the habitat. The portion of the seal abutting the rear wall or outlet would then be considered the mouth. Alternatively, the perimeter of the first stage collection chamber may be smaller than either of the outlets 613, 615 and an expansion sleeve or gasket could be attached to the chamber and positioned to abut the rear wall surface 199 to surround the outlets. The first stage collection chamber 614 thus collects all of the gases or vapors as they exit the outlets.

With continued reference to FIGS. 17-18, a hollow intermediate exhaust duct 622 formed of conventional ducting material includes a first end 624 connected to middle of the top side 626 of the lower first stage collection chamber 614. The exhaust duct includes a curved segment 623 projecting from the top of the first stage collection chamber that curves outwardly to the side of the roll unit 151 and then transitions to a straight segment 625 that projects upwardly toward the top of the roll unit 151. The distal end 627 of the exhaust duct (habitat air carry away) projects through the underside of a common collector chamber 630 on the left side as viewed in FIG. 17 and terminates inside the common collector chamber.

The middle habitat includes a similar first stage collector 616 as well. This collector 616 covers the ventilation outlets 710, 712 of the intermediate habitat 190. Like the lower habitat carry away duct 622, a hollow carry-away duct 632 includes a lowermost end connected to the upper surface 633 of the first stage collector 616 and includes a short curved segment 634 that transitions to a straight duct segment 636. The distal end 637 of the straight duct segment 636 terminates inside the common collector chamber 630 on the right hand side, as viewed in FIG. 17.

With continued reference to FIG. 17, the upper habitat 192 also includes a first stage collection chamber 618. A straight exhaust duct 638 connects the top surface of the first stage collection chamber 618 to the undersurface of the common collector chamber 630 near the middle of the common collector to provide an air passage from the upper habitat first stage collection chamber 618 to the common collector 630. Each of the first stage collection chambers 614, 616, and 618 are discrete from one another and dedicated to removing the exhaust gases arising from a habitat of a particular shelf. In addition, the abutting relationship of the mouth of each collection chamber to the rear wall of each habitat and surrounding of the outlet perimeters ensures that all gases being withdrawn from a habitat do not cross over to another habitat or exit the roll unit prematurely as explained below. It is also preferable to provide a mouth that is larger than the outlet perimeters to allow for some forgiveness in alignment between the mouth and respective outlets as the shelves may be mounted on sliding racks and be moved away from the mouth to gain access into the habitats. Thus, when sliding the shelf back toward the mouth, a perfect alignment is not necessary to ensure a good seal.

Referring to FIGS. 4, 7, and 15, the common collector chamber 630 includes an upper surface 640 that is preferably positioned just beneath and abutting the slotted ceiling panel 122 when the roll unit is rolled into compartment 446. The upper surface includes an exhaust opening 642 (FIG. 4) to direct air flow exiting the common collector chamber 630 into the ceiling collection duct 126 where it may be directed into the ducting tube 132 and then the collector 134 under the negative pressure induced by the overhead vacuum source 137. The vacuum source then directs the exhaust vapors into the final stage exhaust duct 136 thereby removing the vapors to a remote location.

It will be appreciated that other suitable ducting arrangements may be used. For example, as an alternative, the outlet 642 of the common collector 630 ducting system may be connected to a pre-existing building ducting system using a conventional ducting components and couplers. For example, the ducting tube 132 may be sized to couple directly with the primary exhaust outlet 642. Reduction or enlargement ducting tubes may be used to convert from one size to another as would be readily understood by one of ordinary skill in the art. Ducting may be rigid metal piping or flexible metallic or plastic hosing. Conventional heating, venting, air conditioning ducting may be used.

It will be further be appreciated that the first stage collection chambers 614, 616, 618 may also be sub-divided to position a dedicated portion of the collection chamber behind each of the outlets and thus further isolate the left compartment from the right compartment. In addition, an internal separator (not shown) may be inserted or built into the first stage collection chamber 614 to further separate air flow exiting from the left and right sub-compartments. However, a common collection chamber is often suitable as the animal habitat may be separated by a perforated separator panel and thus already share common habitat air such as in the case when animals have already been exposed to one another but must be separated due to hostile actions or otherwise. The addresses the scenario wherein habitat air within the side-by-side sub-compartments are shared by the animals. However, vapors between shelves remain isolated.

Referring to FIGS. 4 and 15, in use, assuming the roll unit 151 will be used in conjunction with an assembled animal display and habitat assembly, any animals to be displayed are placed in their respective habitats 188, 190, or 192 of the roll unit. The roll unit may then be wheeled into a selected compartment such as compartment 446. The opening 642 of the common collector 630 is aligned with the slotted ceiling 122. If necessary, a sleeve, extension, seal, or gasket may be connected between the common collector opening and the slotted ceiling to make a continuous air flow path between the common collector and the ceiling collector 126. Alternatively, the slotted ceiling may be removed and the common collector connected directly to the exhaust duct 132 using conventional heating and air conditioning ducting and couplings.

The motor 138 of the vacuum source 137 is then energized to turn the fan blades 140. The vacuum source begins to draw air from the collector 134 and exhaust duct 136 creating a low pressure area. In response to this low pressure area, the air within the common collector 630 and connected ducts 622, 625, and 638 is drawn toward the vacuum source. This in turn draws habitat air of each habitat 188, 190, and 192 through their respective exhaust outlets 610, 612, 710, 712, and 810, 812 and into the respective first stage collection chambers 614, 616, and 618 as represented by directional arrows 649, 651, and 653. This induces a slight negative pressure in the habitats. As a result of the low pressure environment created by the vacuum source 137, fresh ambient air, as represented by directional arrow 650, is drawn through the inlet 608 and into the habitat 188 to circulate therein as indicated by directional arrows 652, 654, and 656. The circulation path is similar in the middle habitat 190 and upper habitat 192 through their respective collection chambers and associated carry away ducting. The initial ambient air will be provided by the surrounding compartment 446 air. Additional ambient air may be drawn in through the grill vent 70 in the grill section 64 of the compartment under the influence of the vacuum source 137. By maintaining a continuous slight negative pressure with the vacuum source 137, fresh ambient air is continuously introduced into the animal habitats and the habitat air is drawn out of the habitats and collected in the first stage collectors before being directed to the ceiling collector 126 and into the final exhaust 136. The opening of the final exhaust is preferably located in a location remote from the animals and animal handlers. Thus, any vapors or contaminants are collected from each of the habitats and exhausted remotely. With the dedicated first stage collectors, habitat air is not mixed and thus cross contamination of airborne particles is severely inhibited and controlled.

It will be appreciated that while the ventilated roll unit 151 is suitable for use with the animal display and habitat assembly described, the roll unit may operate as a standalone unit. A vacuum source may be coupled to the exhaust outlet 642 or the exhaust outlet may take advantage of the building exhaust ducting by coupling into the suction ducting of the building previously provided at the locale where the animals will be shown. The wheels are also optional and the unit may be constructed as a stationery free standing unit for longer term positioning.

It will further be appreciated that the ducting connecting the common collector 630 with pre-existing building exhaust ducting or with the overhead ceiling ducting of the animal display and habitat assembly is preferably of the quick disconnect variety to facilitate movement of the roll unit and quick teardown or set up or the animal display and habitat assembly.

The present ventilation system preferably relies solely upon a vacuum source to circulate the air into and through the habitats and ventilation system. This facilitates an easier set up than a unit with a blower for introducing ambient air in addition to a vacuum source. The use of a vacuum source alone also avoids the flow rate control issue arising from the use of front end and back end air flow movers. In addition, a blower unit pressurizes the habitats and may force undesirable vapors and contaminants through leaks in the ventilation system. The use of a blower alone has also been found to introduce stagnant areas in the habitats and provides much less control of the air flow than a vacuum source alone and thus the vacuum source alone is preferred.

For some animals, such as reptiles, the use of a blower system removes the humidity from the system and may dry the skin of the animals thereby causing a health hazard to the animals. By using a vacuum source alone, the ambient air is introduced into the animal enclosures and thus the heat, cooling, and humidity differentials are relative to the outside ambient air creating less severe temperature and humidity changes within the habitats. In addition, the use of a vacuum system isolates the left compartment from the right compartment on the same shelf even when their respective exhaust outlets share a common air exhaust chamber. With a vacuum system, it is unnecessary to divide the air exhaust collection chambers for shared exhaust outlets. In the unlikely event of a blowback or back pressure in the system, the ventilation system is designed to withstand moderate back pressure so as not to reintroduce exhaust air back into the habitats. The use of filters over the exhaust outlets may further assist in preventing back flow from entering the habitats. It is preferred to use a slight and barely noticeable negative air pressure to circulate and remove habitat air. However, the vacuum source is of sufficient power to remove any stagnant areas in the habitats.

In this exemplary embodiment, the compartments are all like dimensioned and the outwardly facing display frame and transition members with back to back L-shaped members are equal in width thus resulting in a twelve-sided faceted assembly with five compartments and one security entrance module. This also provides a pleasing symmetrical appearance to the animal display assembly. However, it will be appreciated the dimensions may be varied from modular unit to modular unit. For example, the display frame may having varying widths as can the transition members. While the transition members are illustrated projecting rearwardly from a plane passing through an adjacent frame at an angle of approximately 25-45 degrees as indicated at angle alpha (FIG. 4) by varying the angles of the ends of the bases of the L-shaped frames and corresponding transition flanges 76, different animal display configurations may also be developed with smaller or larger common access areas. It is also contemplated the transition flange may be hingedly connected to the transverse members to facilitate even more radical designs.

The display frame and viewing sheet 70 have also generally been described as planar. However, it will also be appreciated that these sections could be bowed outwardly for instance to change the faceted appearance of the animal display system to one with a more rounded, contoured appearance. Similarly, the transition members may be curved structures as well and an alternative contoured to planar sectional assembly is also contemplated.

The construction of the animal display system lends itself to both small scale and large scale displays. For example, a typical display system for birds is 9-13 feet high and 10-12 feet wide from one display frame to an opposite display frame. However, these exemplary dimensions are merely for explanatory reasons and are not meant to be limiting in any manner.

It will further be appreciated that by removing a few bolts between sections, the overall animal display assembly may be quickly disassembled. A typical assembly time for a five compartment assembly as described herein takes about 3-4 hours for a bird display dimensioned as above using three workers. Thus, the entire display lends itself to being transported to trade shows wherein temporary cages must be set up to more permanent fixtures in a retail setting. In addition, should the floor plan change in the store the animal display and habitat assembly system described herein may easily be moved to a suitable location.

While the present invention has been described herein in terms of a number of preferred embodiments for displaying animals or objects, various changes and improvements may also be made to the invention without departing from the scope and spirit thereof.

We claim:

1. A ventilated animal habitat comprising:
a frame supporting a shelf;

an animal enclosure defined by a front surface with a viewing window, a rear surface, a pair of opposing side surfaces, a floor surface, and a ceiling surface, said enclosure being supported by said shelf and surrounding a volume of habitat air;

a ventilation control region in one of said surfaces, said region including an ambient air supply inlet for introducing a supply of fresh ambient air into said enclosure and an exhaust air outlet defined by a first perimeter for evacuating at least a portion of said volume of habitat air away from said enclosure;

a ducting system supported by said frame and including an exhaust air collection chamber with an entry mouth abutting said ventilation control region of said enclosure and surrounding said first perimeter;

a remote vacuum source operable to draw fresh ambient air into said ambient air supply inlet and draw habitat air into said exhaust air collection chamber; and a carry away duct having a first end connected to said exhaust air collection chamber and a second end in communication with said vacuum source to direct air drawn into said collection chamber to said vacuum source.

2. The ventilated animal habitat as set forth in claim 1 wherein:
said ventilation control region is located in said rear surface.

3. The ventilated animal habitat as set forth in claim 1 further including:
at least one other shelf supported by said frame and supporting a second animal enclosure;
said second animal enclosure including a second ventilation control region;
said ducting system includes a discrete second exhaust air collection chamber;
a second carry away duct having a first end connected to said second air collection chamber and a second distal end, said carry away ducts being discrete from one another;
a common collector chamber in communication with said second ends of said carry away duct and said second carry away duct and also in communication with said vacuum source and operable to direct air entering said common collector chamber for either of said carry away ducts to said vacuum source.

4. The ventilated animal habitat as set forth in claim 3 further including:
a third shelf supported by said frame;
a third enclosure supported by said third shelf and including a third ventilation region;
a third air exhaust collection chamber; and
a third carry away duct having a first end in communication with said third air exhaust collection chamber and a distal end in communication with said common collector chamber.

5. The ventilated animal habitat as set forth in claim 3 wherein:
said common collector is mounted to the top of said frame and includes an underside coupled to said distal ends of said carry away duct and said second carry away duct and a top side in communication with said vacuum source.

6. The ventilated animal habitat as set forth in claim 1 wherein:
said enclosure is sub-divided into a first compartment and a second compartment by a separator panel, each said compartment includes a set of discrete ambient air supply inlets and exhaust air outlets; and
said mouth of said exhaust air collection chamber surrounds both sets of inlets and outlets.

7. The ventilated animal habitat as set forth in claim 1 wherein:
said inlet is covered by a screen element.

8. The ventilated animal habitat as set forth in claim 1 wherein:
said inlet is covered by a filter element.

9. The ventilated animal habitat as set forth in claim 1 wherein:
said outlet is covered by a screen element.

10. The ventilated animal habitat as set forth in claim 1 wherein:
said outlet is covered by a filter element.

11. The ventilated animal habitat as set forth in claim 1 wherein:
a perimeter of said mouth of said air exhaust collection chamber is equal to or greater than said first perimeter.

12. The ventilated animal habitat as set forth in claim 1 wherein:
said enclosure is a rectangular tank with said ventilation control region being located in said rear surface.

13. The ventilated animal habitat as set forth in claim 1 wherein:
said air exhaust outlet has a vertical centerline measured from a bottom of said frame;
a vertical centerline of said mouth of said air exhaust collection chamber is registered with said vertical centerline of said air exhaust outlet.

14. The ventilated animal habitat as set forth in claim 1 wherein:
said outlet is positioned above and in transverse alignment with said inlet.

15. The ventilated animal habitat as set forth in claim 1 wherein:
said carry away duct includes a curved section terminating in said first end and a straight section terminating in said second end.

16. The ventilated animal habitat as set forth in claim 1 wherein:
said front viewing window forms the entire front surface of said enclosure.

17. The ventilated animal habitat as set forth in claim 1 wherein:
said frame includes a bottom support; and
a set of wheels is connected to the underside of said bottom support for rolling said frame for moving said frame to alternate locations.

18. The ventilated animal habitat as set forth in claim 1 wherein:
upon actuation of said vacuum source, said ambient air supply inlet directs ambient air into a lower portion of said enclosure when said vacuum source is operating and said habitat air is exhausted through said exhaust air outlet near a top portion of said enclosure.

19. A ventilated animal habitat comprising:
a frame supporting at least one shelf;
an animal enclosure with a back wall, said enclosure being supported on said shelf and surrounding a volume of habitat air;
an ambient air supply inlet for introducing a supply of fresh ambient air into said enclosure and an exhaust air outlet defined by a first perimeter for evacuating at least a portion of said volume of habitat air away from said enclosure;

a ducting system supported by said frame and including an exhaust air collection chamber with an entry mouth abutting said back wall and surrounding said exhaust air outlet; and a carry away duct having a first end connected to said exhaust air collection chamber and a second distal end operable to be placed in communication with a vacuum source and to direct air drawn into said collection chamber to said vacuum source when said vacuum source is in operation.

20. A ventilated animal habitat comprising:

a frame having a plurality of shelves;

at least one isolated animal enclosure being supported on each of said shelves, each said enclosure surrounding a discrete volume of habitat air and including a discrete ventilation region with at least one inlet and at least one outlet;

a low pressure air collector chamber supported by said frame in registration with each ventilation region, each said air collector chamber including a forward facing extension terminating in a mouth abutting an exterior of a rear wall of said enclosure and surrounding a perimeter defining said outlet in said ventilation region;

a plurality of discrete air flow pathways corresponding to each of said shelves, each of said air flow pathways including a first end for connecting to unique ones of said air collector chambers and a second distal end; and a common exhaust duct connected to each of said second distal ends of said air flow pathways and including a primary exhaust opening operable to placed in communication with an air mover so as to remove habitat air along said discrete air flow pathways from each enclosure and draw fresh ambient air into said enclosures through said inlets.

* * * * *